US008467804B2

(12) United States Patent
Lindquist (10) Patent No.: US 8,467,804 B2
(45) Date of Patent: Jun. 18, 2013

(54) MOBILE TERMINALS AND METHODS FOR REGULATING POWER-ON/OFF OF A GPS POSITIONING CIRCUIT (75) Inventor: Björn Lindquist, Bjärred (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1028 days.

(21) Appl. No.: 11/873,171

(22) Filed: Oct. 16, 2007

(65) Prior Publication Data
US 2009/0098880 A1 Apr. 16, 2009

(51) Int. Cl.
H04W 24/00 (2009.01)

(52) U.S. Cl.
USPC .................. 455/456.1; 455/456.4; 455/456.2; 455/418; 455/556.1; 455/574

(58) Field of Classification Search
USPC ............. 455/456.4, 574, 456.1, 456.2, 456.3, 455/552.1, 421; 370/311
See application file for complete search history.

(56) References Cited

U.S. PATENT DOCUMENTS

| 5,448,773 | A | 9/1995 | McBurney et al. | |
| 5,539,647 | A | 7/1996 | Shibata et al. | |
| 5,883,594 | A | 3/1999 | Lau | |
| 6,029,111 | A | 2/2000 | Croyle | |
| 6,141,570 | A | 10/2000 | O'Neill, Jr. et al. | |
| 6,297,768 | B1 * | 10/2001 | Allen, Jr. ................... | 342/357.1 |
| 7,043,258 | B2 * | 5/2006 | Haddrell .................... | 455/456.6 |
| 7,251,493 | B2 | 7/2007 | Camp, Jr. et al. | |
| 7,412,266 | B2 * | 8/2008 | Underbrink et al. .......... | 455/574 |
| 2002/0177476 | A1 * | 11/2002 | Chou ............................ | 455/574 |
| 2003/0008671 | A1 | 1/2003 | Lundgren et al. | |
| 2004/0125014 | A1 | 7/2004 | Sun | |

(Continued)

FOREIGN PATENT DOCUMENTS

| EP | 1 028 598 A1 | 8/2000 |
| EP | 1 205 896 A2 | 5/2002 |

(Continued)

OTHER PUBLICATIONS

Notification of Transmittal of the International Search Report and the Written Opinion of the International Searching Authority, or the Declaration; International Search Report; Written Opinion of the International Searching Authority, PCT Application No. PCT/EP2008/053726, Jul. 17, 2009.

(Continued)

*Primary Examiner* — Kathy Wang-Hurst
(74) *Attorney, Agent, or Firm* — Myers Bigel Sibley & Sajovec, P.A.

(57) ABSTRACT

A method for determining location of a mobile terminal includes repetitively switching power-on and power-off to a GPS receiver circuit which determines location of the mobile terminal using GPS signals. The power-on to power-off duty cycle of the GPS receiver circuit is regulated in response to distance that the mobile terminal has moved from a previously determined location. The power-on to power-off duty cycle can be regulated in response to identifying GPS isolation, in response to an acceleration-determined distance from previous GPS-determine location, an acceleration-determined velocity of the mobile terminal, availability of position assistance information from a cellular system, presence/absence of signals from a WLAN/Bluetooth device, and/or detection of a new cellular base station ID.

18 Claims, 3 Drawing Sheets

U.S. PATENT DOCUMENTS

| | | | |
|---|---|---|---|
| 2004/0192352 A1* | 9/2004 | Vallstrom et al. | 455/456.6 |
| 2004/0198386 A1 | 10/2004 | Dupray | |
| 2005/0237347 A1 | 10/2005 | Yamaji et al. | |
| 2006/0014531 A1* | 1/2006 | Nam et al. | 455/418 |
| 2006/0238417 A1 | 10/2006 | Jendbro et al. | |
| 2006/0262739 A1* | 11/2006 | Ramirez et al. | 370/311 |
| 2007/0037610 A1* | 2/2007 | Logan | 455/574 |
| 2008/0012759 A1* | 1/2008 | Te-Yi | 342/357.06 |
| 2008/0059061 A1* | 3/2008 | Lee | 701/209 |

FOREIGN PATENT DOCUMENTS

| | | |
|---|---|---|
| EP | 1 221 586 A2 | 7/2002 |
| JP | 2005-284596 A | 10/2005 |
| JP | 3834680 B2 | 10/2006 |
| WO | WO 01/20260 A1 | 8/2001 |

OTHER PUBLICATIONS

Kao "Integration of GPS and Dead-Reckoning Navigation Systems" *IEEE Vehicle Navigation and Information Systems Conference*, Oct. 20-23, 1991, pp. 635-643.

Japanese Office Action Corresponding to Japanese Patent Application No. 2010-529306; Mailing Date: Jun. 4, 2012; 3 Pages (Foreign Text Only).

Invitation to Pay Additional Fees and, Where Applicant, Protest Fee, PCT Application No. PCT/EP2008/053726, Jul. 30, 2008.

* cited by examiner

MOBILE TERMINALS AND METHODS FOR REGULATING POWER-ON/OFF OF A GPS POSITIONING CIRCUIT

BACKGROUND OF THE INVENTION

The present invention relates to mobile terminals and methods for determining mobile terminal location and, more particularly, to apparatus and methods for determining mobile terminal location based on Global Positioning System (GPS) signals.

Many mobile terminals, such as cellular mobile terminals, personal digital assistants (PDAs), laptop computers, and the like, are now equipped with GPS receivers. GPS is a space-based radio triangulation system using a constellation of satellites in orbit around the earth. A GPS receiver triangulates its position based on timing of radio signals it receives from various ones of the satellites and the known location of those satellites.

Determining the position of a GPS receiver typically requires the acquisition of a set of navigational parameters from the navigational data signals of four or more GPS satellites. This process can take several minutes, as the duration of the GPS positioning process is generally dependent upon how much information a GPS receiver has initially. Most GPS receivers are programmed with almanac data, which coarsely describes the expected satellite positions for up to one year ahead. However, if the GPS receiver does not have knowledge of its own approximate location, then it may not require significantly more time to acquire and lock onto GPS signals from the visible satellites. The process of monitoring GPS signals can be significantly affected by environmental factors. For example, GPS signals that may be easily acquired in the open typically become harder or impossible to acquire when a receiver is within a building, a vehicle, and/or under foliage.

In order to improve GPS receiver performance, techniques have been developed to provide GPS receivers with assistance information, e.g., time and position estimates, satellite ephemeris and clock information, and visible satellite list (which generally varies with the location of the mobile terminal), which can enable a GPS receiver to expedite its acquisition of GPS signals and associated position determination. Such assistance information may be transmitted, for example, from a terrestrial cellular communication system. Assistance information may not always be available, however, and a user may experience a significant increase in response time of the GPS receiver when such assistance information is not available, for example, when the user is traveling in a region not serviced by the user's cellular provider.

SUMMARY OF THE INVENTION

Some embodiments of the present invention are directed to a method for determining location of a mobile terminal which includes repetitively switching power-on and power-off to a GPS receiver circuit which determines location of the mobile terminal using GPS signals. The power-on to power-off duty cycle of the GPS receiver circuit is regulated in response to distance that the mobile terminal has moved from a previously determined location.

In some further embodiments, regulation of the power-on to power-off duty cycle of the GPS receiver circuit includes: detecting when the mobile terminal is GPS isolated in response to insufficient GPS signal strength for the GPS receiver circuit to determine location of the mobile terminal during at least a threshold length of time; powering-off the GPS receiver circuit in response to detecting that the mobile terminal is GPS isolated; determining a present acceleration-based location of the mobile terminal using acceleration information from an accelerometer circuit in the mobile terminal during the power-off cycle of the GPS receiver circuit; extending duration of the power-off cycle of the GPS receiver circuit until a distance between the present acceleration-based location and a previous GPS-determined location of the mobile terminal exceeds a threshold distance; and upon powering-on the GPS receiver circuit, attempting to determine a present GPS-determined location of the mobile terminal.

Significant reduction in power consumption by the mobile terminal may be achieved by selectively powering-off the GPS receiver circuit, and by determining when to power-on the GPS receiver circuit using the acceleration information from the acceleration circuit to determine how far the mobile terminal has moved.

In some further embodiments, the method further includes calibrating the accelerometer circuit in response to a distance between a present acceleration-based location and a previous GPS-determined location of the mobile terminal exceeding a threshold calibration distance.

In some further embodiments, the method further includes detecting when the mobile terminal is GPS isolated where there is insufficient GPS signal strength for the GPS receiver circuit to determine location of the mobile terminal; logging the location of the GPS isolation; and subsequently responding to the mobile terminal being located at a previously logged GPS isolation location by powering-off the GPS receiver circuit. The mobile terminal can receive over a wireless air interface from another communication device at least one location where the mobile terminal will be GPS isolated, and can add the received at least one GPS isolation location to the log.

In some further embodiments, regulation of the power-on to power-off duty cycle of the GPS receiver circuit includes: determining a GPS-based location of the mobile terminal using the GPS receiver circuit during the power-on cycle; determining a present acceleration-based location of the mobile terminal using acceleration information from an accelerometer circuit in the mobile terminal during the power-off cycle of the GPS receiver circuit; and extending duration of the power-off cycle of the GPS receiver circuit until the distance between the present acceleration-based location and the GPS-based location of the mobile terminal exceeds a threshold distance.

In some further embodiments, regulation of the power-on to power-off duty cycle of the GPS receiver circuit includes: determining a GPS-based location of the mobile terminal using the GPS receiver circuit during the power-on cycle; determining velocity of the mobile terminal using acceleration information from an accelerometer circuit in the mobile terminal during the power-off cycle of the GPS receiver circuit; and regulating the power-on to power-off duty cycle of the GPS receiver circuit in response to the determined velocity of the mobile terminal.

In some further embodiments, regulation of the power-on to power-off duty cycle of the GPS receiver circuit in response to the determined velocity of the mobile terminal includes: increasing the power-on to power-off duty cycle of the GPS receiver circuit in response to the determined mobile terminal velocity exceeding a threshold velocity; and decreasing the power-on to power-off duty cycle of the GPS receiver circuit in response to the determined mobile terminal velocity being less than a threshold velocity.

In some further embodiments, regulation of the power-on to power-off duty cycle of the GPS receiver circuit includes: determining availability of position assistance information from a cellular system for use by the GPS receiver circuit to determine mobile terminal position; increasing the power-on to power-off duty cycle of the GPS receiver circuit in response to availability of position assistance information from a cellular system; and decreasing the power-on to power-off duty cycle of the GPS receiver circuit in response to unavailability of position assistance information from a cellular system.

In some further embodiments, regulation of the power-on to power-off duty cycle of the GPS receiver circuit includes decreasing the power-on to power-off duty cycle of the GPS receiver circuit in response to discovering signals from a wireless local area network (WLAN) device associated with a previously determined and/or defined location where the mobile terminal remained substantially stationary for at least a threshold time.

In some further embodiments, regulation of the power-on to power-off duty cycle of the GPS receiver circuit includes increasing the power-on to power-off duty cycle of the GPS receiver circuit in response to detecting absence of signals from the WLAN device associated with the previously determined and/or defined location where the mobile terminal remained substantially stationary for at least the threshold time.

In some further embodiments, regulation of the power-on to power-off duty cycle of the GPS receiver circuit includes decreasing the power-on to power-off duty cycle of the GPS receiver circuit in response to discovering signals from a Bluetooth device associated with a previously determined and/or defined location where the mobile terminal remained substantially stationary for at least a threshold time.

In some further embodiments, regulation of the power-on to power-off duty cycle of the GPS receiver circuit includes increasing the power-on to power-off duty cycle of the GPS receiver circuit in response to detecting absence of signals from the Bluetooth device associated with the previously determined and/or defined location where the mobile terminal remained substantially stationary for at least the threshold time.

In some further embodiments, regulation of the power-on to power-off duty cycle of the GPS receiver circuit includes extending duration of the power-off cycle of the GPS receiver circuit until the mobile terminal receives and identifies a new cellular base station ID from a transmitting cellular base station.

Some other embodiments of the present invention are directed to a mobile terminal that includes a GPS receiver circuit and a controller circuit. The GPS receiver circuit is configured to determine location of the mobile terminal using GPS signals. The controller circuit is configured to repetitively switch power-on and power-off to the GPS receiver circuit, and to regulate the power-on to power-off duty cycle of the GPS receiver circuit in response to distance that the mobile terminal has moved from a previously determined location.

In some further embodiments, the mobile terminal further includes: an accelerometer circuit that generates acceleration information which is indicative of acceleration of the mobile terminal; and an acceleration-based position determination circuit configured to determine a present acceleration-based location of the mobile terminal using the acceleration information from the accelerometer circuit during the power-off cycle of the GPS receiver circuit. The GPS receiver circuit is configured to detect when the mobile terminal is GPS isolated in response to insufficient GPS signal strength to determine location of the mobile terminal during at least a threshold length of time. The controller circuit is configured to power-off the GPS receiver circuit in response to detecting that the mobile terminal is GPS isolated, to extend duration of the power-off cycle of the GPS receiver circuit until a distance between the present acceleration-based location and a previous GPS-determine location of the mobile terminal exceeds a threshold distance, and to attempt to determine a present GPS-determined location of the mobile terminal upon powering-on the GPS receiver circuit.

In some further embodiments, the mobile terminal further includes: an accelerometer circuit that generates acceleration information which is indicative of acceleration of the mobile terminal; and an acceleration-based position determination circuit configured to determine a present accelerometer-based location of the mobile terminal using the acceleration information from the accelerometer circuit during the power-off cycle of the GPS receiver circuit. The GPS receiver circuit determines a GPS-based location of the mobile terminal during the power-on cycle. The controller circuit extends the duration of the power-off cycle of the GPS receiver circuit until the distance between the present accelerometer-based location and the GPS-based location of the mobile terminal exceeds a threshold distance.

In some further embodiments, the mobile terminal further includes a calibration circuit configured to calibrate the accelerometer circuit in response to a distance between a present acceleration-based location and a previous GPS-determined location of the mobile terminal exceeding a threshold calibration distance.

In some further embodiments, the mobile terminal further includes: an accelerometer circuit that generates acceleration information which is indicative of acceleration of the mobile terminal; and a velocity determination circuit configured to determine velocity of the mobile terminal using the acceleration information from the accelerometer circuit during the power-off cycle of the GPS receiver circuit. The controller circuit is configured to increase the power-on to power-off duty cycle of the GPS receiver circuit in response to the determined velocity of the mobile terminal exceeding a threshold velocity, and to decrease the power-on to power-off duty cycle of the GPS receiver circuit in response to the determined velocity of the mobile terminal being less than a threshold velocity.

In some further embodiments, the mobile terminal further includes a cellular transceiver circuit configured to communicate with a cellular system and to receive position assistance information from a cellular system over a wireless air interface. The GPS receiver circuit is configured to use the receive position assistance information to lock onto the GPS signals and determine location of the mobile terminal. The controller circuit is configured to determine availability of the position assistance information from the cellular system, to increase the power-on to power-off duty cycle of the GPS receiver circuit in response to availability of the cellular system position assistance information, and to decrease the power-on to power-off duty cycle of the GPS receiver circuit in response to unavailability of the cellular system position assistance information.

In some further embodiments, the controller circuit is configured to decrease the power-on to power-off duty cycle of the GPS receiver circuit in response to discovering signals from a WLAN device associated with a previously determined and/or defined location where the mobile terminal remained substantially stationary for at least a threshold time, and to increase the power-on to power-off duty cycle of the GPS receiver circuit in response to detecting absence of signals from the WLAN device associated with the previously determined and/or defined location where the mobile terminal remained substantially stationary for at least the threshold time.

In some further embodiments, the controller circuit is configured to decrease the power-on to power-off duty cycle of the GPS receiver circuit in response to discovering signals from a Bluetooth device associated with a previously determined and/or defined location where the mobile terminal remained substantially stationary for at least a threshold time, and to increase the power-on to power-off duty cycle of the GPS receiver circuit in response to detecting absence of signals from the Bluetooth device associated with a previously determined and/or defined location where the mobile terminal remained substantially stationary for at least the threshold time.

Some other embodiments of the present invention are directed to a mobile terminal that includes a GPS receiver circuit and a controller circuit. The GPS receiver circuit is configured to determine location of the mobile terminal using GPS signals. The controller circuit is configured to regulate power supplied to the GPS receiver circuit in response to distance that the mobile terminal has moved from a location previously determined using GPS signals.

In some further embodiments, the controller circuit is configured to power-on the GPS receiver circuit in response to discovering absence of RF signals from a Bluetooth device and/or a WLAN device with which the mobile terminal was previously communicating.

In some further embodiments, the controller circuit is configured to power-on the GPS receiver circuit in response to receiving and identifying a new cellular base station ID from a cellular base station.

Other electronic devices and/or methods according to embodiments of the invention will be or become apparent to one with skill in the art upon review of the following drawings and detailed description. It is intended that all such additional electronic devices and methods be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

The present invention will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

For purposes of illustration and explanation only, various embodiments of the present invention are described herein in the context of mobile terminals that are configured to carry out cellular communications (e.g., cellular voice and/or data communications). It will be understood, however, that the present invention is not limited to such embodiments and may be embodied generally in any mobile terminal that includes a GPS receiver circuit that determines location of the mobile terminal using GPS signals, and which is configured to switch power-on and power-off to the GPS receiver circuit in response to various defined triggering events.

While various embodiments of the invention are described herein with reference to GPS satellites, it will be appreciated that they are applicable to positioning systems which utilize pseudolites or a combination of satellites and pseudolites. Pseudolites are ground based transmitters that broadcast a signal similar to a traditional satellite-sourced GPS signal modulated on an L-band carrier signal, generally synchronized with GPS time. The term "satellite", as used herein, is intended to include pseudolites or equivalents of pseudolites, and the term GPS signals, as used herein, is intended to include GPS-like signals from pseudolites or equivalents of pseudolites. Also, while the following discussion references the United States GPS system, various embodiments herein can be applicable to similar satellite positioning systems, such as the GLONASS system or GALILEO system. The term "GPS", as used herein, includes such alternative satellite positioning systems, including the GLONASS system and the GALILEO system. Thus, the term "GPS signals" can include signals from such alternative satellite positioning systems.

Figure 1:
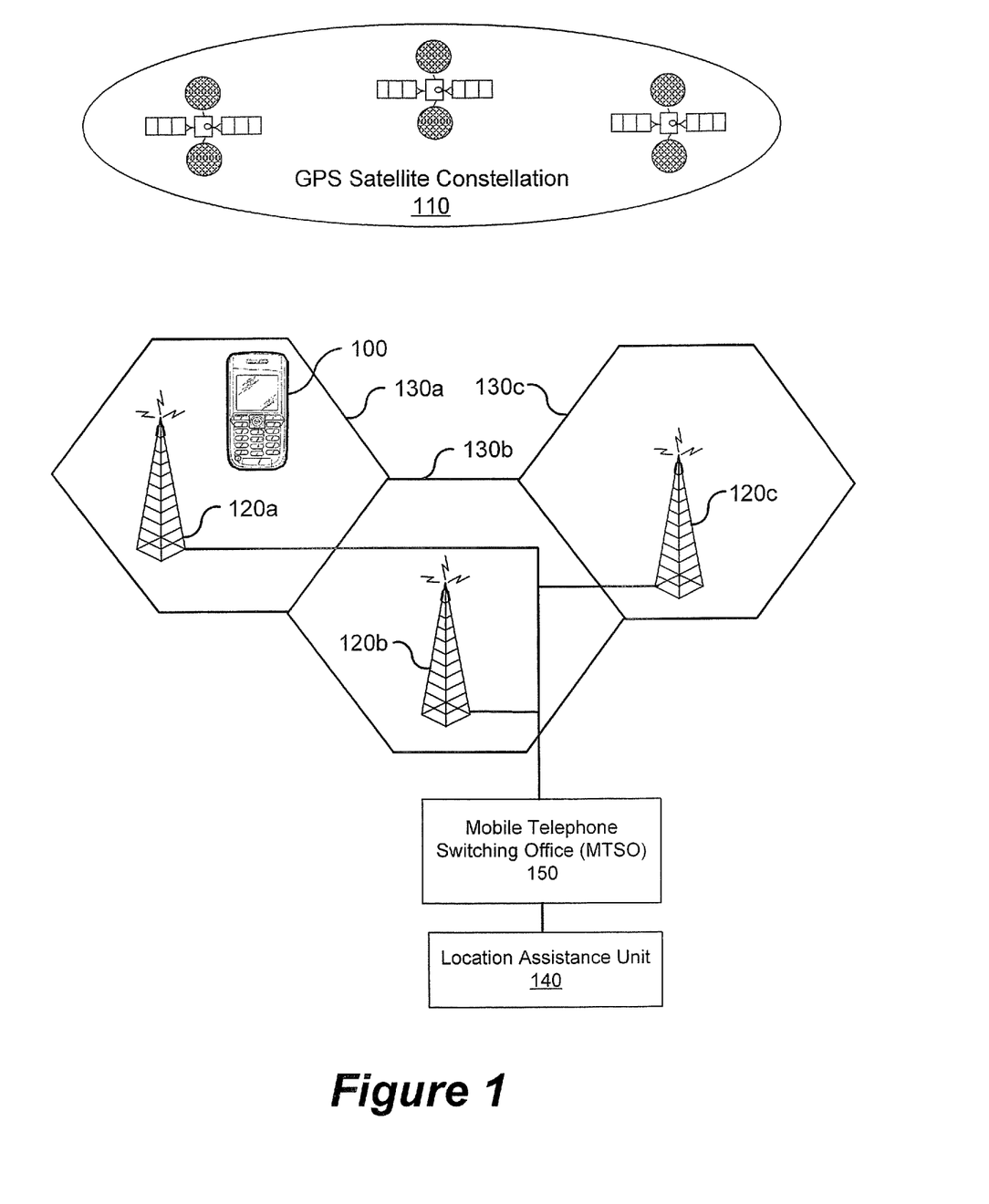
FIG. 1 is a schematic block diagram of a terrestrial and satellite communication system that includes an exemplary mobile terminal which regulates power to a GPS receiver circuit in accordance with some embodiments of the present invention.
Figure 2:
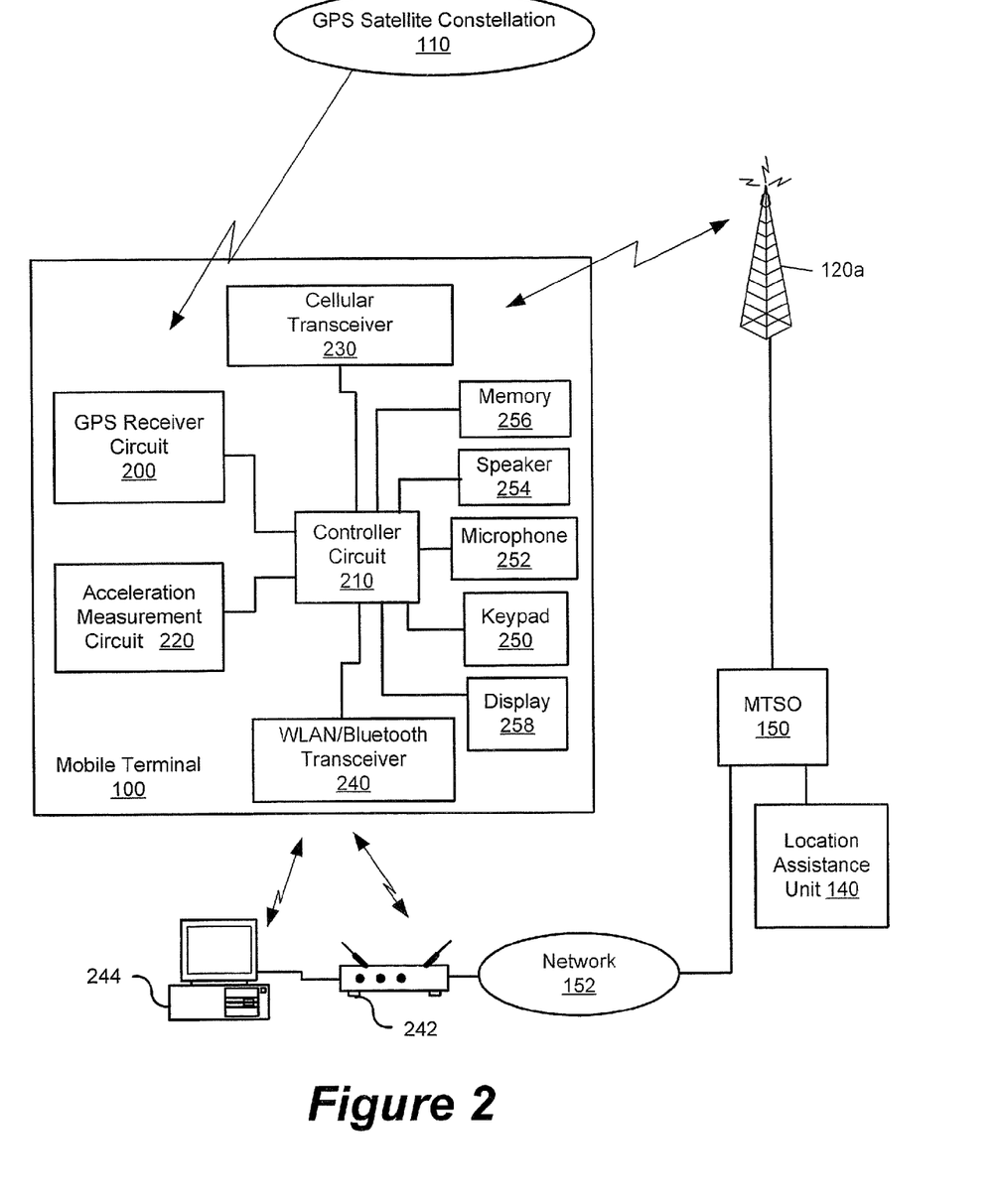
FIG. 2 is a schematic block diagram illustrating further aspects of the exemplary mobile terminal shown in FIG. 1 in accordance with some embodiments of the present invention.

FIG. 1 is a schematic block diagram of a terrestrial and satellite communication system that includes an exemplary mobile terminal 100 with a GPS receiver circuit. FIG. 2 is a schematic block diagram illustrating further aspects of the mobile terminal 100 shown in FIG. 1.

Referring to FIGS. 1 and 2, the mobile terminal 100 includes a GPS receiver circuit 200 that determines geographic location of the mobile terminal 100 using GPS radio signals that are received from a constellation of GPS satellites 110. The GPS receiver circuit 200 receives GPS radio signals from visible satellites and measures the time that the radio signals take to travel from the respective GPS satellites to the mobile terminal 100. By multiplying the travel time by the propagation speed, the GPS receiver circuit 200 calculates a range for each satellite in view. Ephemeris information provided in the GPS radio signal describes the satellite's orbit and velocity, thereby enabling the GPS receiver circuit 200 to calculate the position of the mobile terminal 100 through a process of triangulation.

Startup of the GPS receiver circuit 200 typically requires the acquisition of a set of navigational parameters from the navigational data signals of four or more GPS satellites. This process of initializing the GPS receiver circuit 200 can take up to several minutes, depending upon how much information the GPS receiver circuit 200 has initially, such as knowledge of its own approximate location and/or time.

The mobile terminal 100 can include a cellular transceiver 230 that can communicate with a plurality of cellular base stations 120a-c, each of which provides cellular communications within their respective cells 130a-c. The cellular transceiver 230 can be configured to encode/decode and control communications according to one or more cellular protocols, which may include, but are not limited to, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS).

The cellular transceiver 230 can receive position assistance information from the cellular system via one or more of the base stations 120a-c. The cellular system can include a location assistance unit 140 that generates position assistance information which is communicated through a mobile telephone switching office (MTSO) 150 and one or more of the base stations 120a-c. The MTSO 150 can be connected to a network 152, such as the Internet, another packet-switched network, and/or a public switched telephone network (PSTN). The location assistance unit 140 may, for example, determine location of the mobile terminal 100 based on triangulation of signals transmitted by the mobile terminal 100 and received by a plurality of the base stations 120a-c having known locations. Alternatively or additionally, the location assistance unit 140 may cause position assistance information, such as timing signals and associated base station location information, to be transmitted through a plurality of the base stations 120a-c to the mobile terminal 100, so that the mobile terminal 100 can triangulate its location therefrom. Alternatively or additionally, the location assistance unit 140 may deliver GPS coverage data based on mobile terminal 100 expected or calculated position.

The mobile terminal 100 may alternatively or additionally receive position assistance information via a WLAN/Bluetooth transceiver 240 from a WLAN device (e.g., WLAN router) and/or from a Bluetooth capable communication device which may, in turn, receive the position assistance information from the location assistance unit 140.

The GPS receiver circuit 200 can use the position assistance information to more rapidly and/or more reliably lock onto the GPS signals and determine its location. For example, when the GPS receiver circuit 200 is powered-on without apriori knowledge of its approximate location, it may take a minute or several minutes to acquire the GPS signals. In contrast, when the GPS receiver circuit 200 is powered-on and is provided with position assistance information from the cellular system, it may be able to acquire the GPS signals within a few seconds.

The mobile terminal 100 can further include a controller circuit 210 communicatively connected to a wireless local area network/Bluetooth transceiver 240, a keypad 250, a microphone 252, a speaker 254, a memory 256, and a display 258. The controller 210 may include a general purpose processor and/or digital signal processor which can execute instructions from the memory 256 that carry out various functions described herein. Although the controller 210 is illustrated as being separate from the GPS receiver circuit 200, it is to be understood that at least some of its functionality may be embodied within the GPS receiver circuit 200 and/or vice versa.

In accordance with some embodiments, the controller 210 manages power consumption by the GPS receiver circuit 200 by controlling the power-on and power-off state of the GPS receiver circuit 200. For example, the controller 210 can repetitively switch power-on and power-off to the GPS receiver circuit 200, and regulate the power-on to power-off duty cycle of the GPS receiver circuit 200 responsive to a distance that the mobile terminal 100 has moved from a previously determined location. The controller 210 may control a switch that toggles between connecting and disconnecting power to the entire GPS receiver circuit 200 and/or may generate a signal that causes at least a portion of the GPS receiver circuit 200 to toggle between being powered-on and being powered-off.

For example, while the mobile terminal 100 is remaining relatively stationary (e.g., while left in an unattended car or left on a nightstand overnight), the controller 210 can automatically power-off the GPS receiver circuit 200. In response to the mobile terminal 100 sensing that it has moving a sufficient distance away from a previous GPS-determined location, the controller 210 can automatically power-on the GPS receiver circuit 200 to attempt to determine location of the mobile terminal 100 using GPS signals.

By way of further example, while the mobile terminal 100 is within a building which is isolated from GPS signals and, consequently, is located where it cannot use the GPS receiver circuit 200 to determine its location, the controller 210 can respond by automatically powering-off the GPS receiver circuit 200. In response to the mobile terminal 100 moving a sufficient distance away from a previous GPS-determined location (e.g., moving a sufficient distance so as to be outside the building), the controller 210 can automatically power-on the GPS receiver circuit 200 to attempt to use GPS signals to determine its location.

Figure 4:
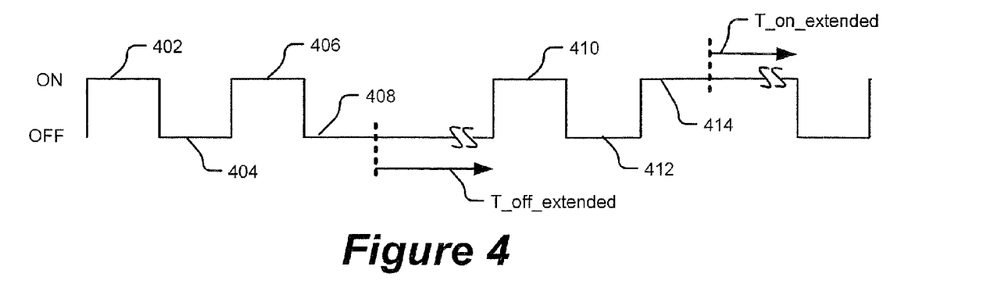
FIG. 4 is a timing diagram illustrating regulation of the power-on to power-off duty cycle of the GPS receiver circuit of FIG. 2 in accordance with some embodiments of the present invention.

FIG. 4 is a timing diagram illustrating regulation of the power-on to power-off duty cycle of the GPS receiver circuit 200 in accordance with some embodiments of the present invention. Referring to FIG. 4, the GPS receiver circuit 200 is powered-on for a first duration 402, powered-off for second duration 404, and then powered-on for a third duration 406. The lengths of the first, second, and third durations 402, 404, and 406 (i.e., the power-on to power-off duty cycle) are regulated in response to various trigger events, which are described further below. For example, the GPS receiver circuit 200 is maintained powered-off during a fourth duration 408 for an extended time (T_off_extended), thereby decreasing the power-on to power-off duty cycle.

As will be described below with regard to FIG. 3, the GPS receiver circuit 200 may be powered-off, and may be maintained powered-off for an increased duration (e.g., decreased power-on to power-off duty cycle) in response to trigger events such as, for example, the mobile terminal 100 remaining substantially stationary, having less than a threshold velocity, detecting availability of cellular assisted positioning, discovering presence of a WLAN and/or Bluetooth device associated with a previously observed/defined location where the mobile terminal remained stationary, and/or detecting that the mobile terminal 100 is located in a GPS isolated region (e.g., within a building).

In response to other trigger events described below, the GPS receiver circuit 200 is powered-on for a fifth duration 410, is then powered-off for a sixth duration 412. As shown, the GPS receiver circuit 200 is maintained powered-on during a seventh duration 414 for an extended time (T_on_extended), thereby increasing the power-on to power-off duty cycle. As will be further described below with regard to FIG. 3, the GPS receiver circuit 200 may be powered-on, and may be maintained powered-on for an increased duration (e.g., increased power-on to power-off duty cycle) in response to trigger events such as, for example, the mobile terminal 100 traveling at least a threshold distance from a last GPS-based determined position, having at least a threshold velocity, detecting unavailability of cellular assisted positioning, discovering absence of signals from a WLAN and/or Bluetooth device associated with a previously observed/defined location where the mobile terminal remained stationary, and/or detecting a new cellular base station ID.

Figure 3:
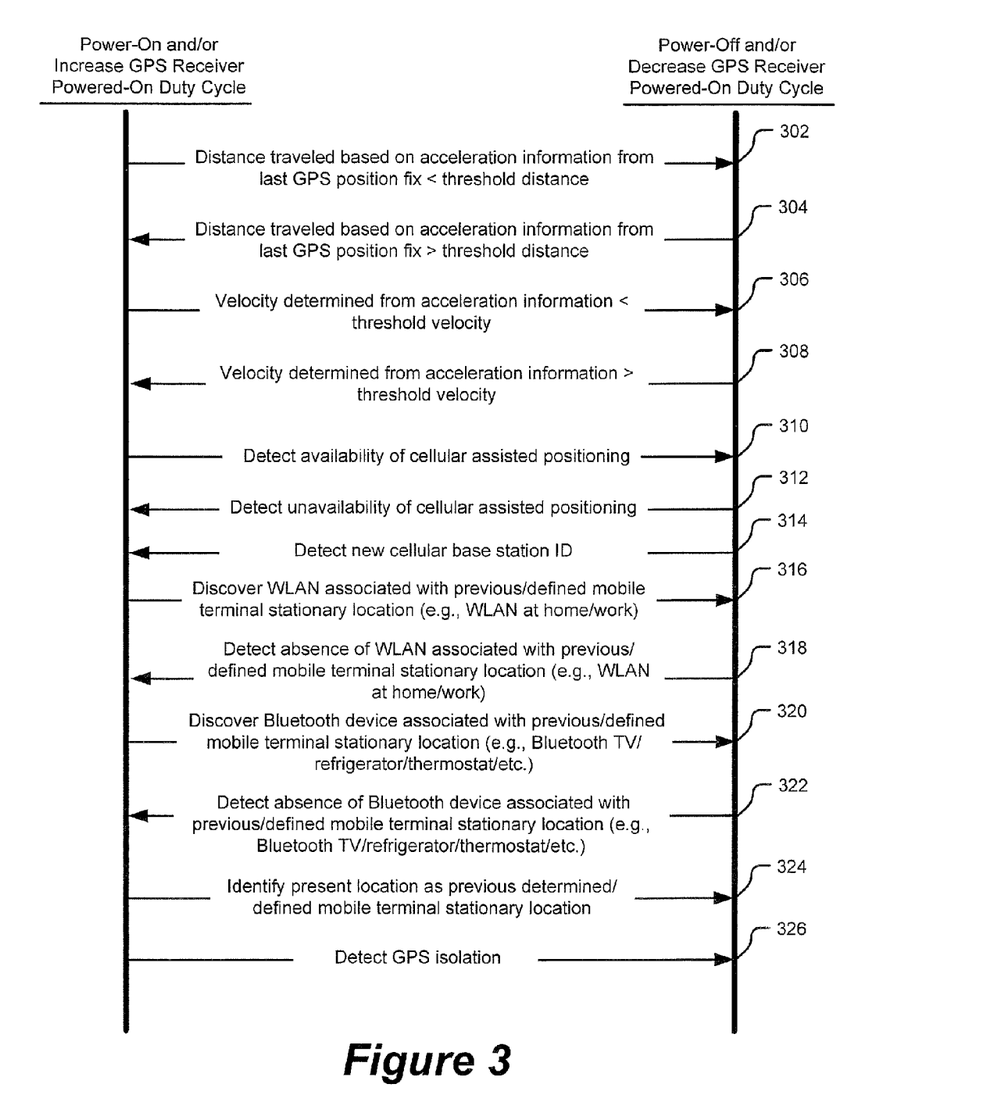
FIG. 3 is an event diagram showing trigger events and associated methods that trigger powering-on/powering-off the GPS receiver circuit of FIG. 2, and/or trigger increase/decrease of the power-on to power-off duty cycle of the GPS receiver circuit in accordance with some embodiments of the invention.

FIG. 3 is an event diagram that shows trigger events and associated methods that can cause the controller 210 to regulate power to GPS receiver circuit 200. The controller 210 may respond to one or more of the trigger events by carrying-out a single defined action of powering-on or powering-off the GPS receiver circuit 200. Alternatively, the controller 210 may repetitively power-on and power-off the GPS receiver circuit 200 and regulate (increase/decrease) the power-on to power-off duty cycle (i.e., ratio of the power-on duration to the power-off duration) of the GPS receiver circuit 200 in response to one or more of the trigger events.

The distance between the mobile terminal 100 and a location, which was previously determined based on GPS signals, is detected based on sensed acceleration of the mobile terminal 100. Referring to trigger event 302, when, after a threshold time has elapsed since the previous GPS position determination, the mobile terminal 100 is determined to still be less than a threshold distance away from a previously determined GPS position, the controller 210 can respond by powering-off the GPS receiver circuit 200. When the GPS receiver circuit 200 is being repetitively cycled on and off, the controller 210 may decreasing the power-on to power-off duty cycle by extending the power-off time of the GPS receiver circuit 200 and/or decreasing the power-on time.

In contrast, referring to trigger event 304, when the mobile terminal 100 is determined to be at least the threshold distance away from the previously determined GPS position, the controller circuit 210 can respond by turning-on the GPS receiver circuit 200. When the GPS receiver circuit 200 is being repetitively cycled on and off, the controller 210 can increase the power-on to power-off duty cycle of the GPS receiver circuit 200 by decreasing the power-off time of the GPS receiver circuit 200 and/or increasing the power-on time.

The threshold distance need not be static, as may be regulated by the controller 210 to vary in response to, for example, time, velocity of the mobile terminal 100, number and/or type of other communication networks that are detected by the mobile terminal (e.g., presence/absence of defined cellular system/WLAN/Bluetooth network).

The mobile terminal 100 can sense acceleration using an acceleration measurement circuit 220 that generates acceleration information responsive to acceleration. While the GPS receiver 200 is powered-off, the controller 210 uses the acceleration information to determine the distance between the mobile terminal 100 and a previous location that was determined by the GPS receiver circuit 200 from GPS signals. For example, the controller 210 can double integrate the acceleration signal over time to determine the mobile terminal's location while the GPS receiver circuit 200 is powered-off. The acceleration measurement circuit 220 may include at least a two-axis accelerometer to sense acceleration in at least two directions that can be parallel to at least a two dimensional direction of travel of the mobile terminal 100. Because the mobile terminal 100 may be held at various angles relative to ground, it may include a three-axis accelerometer, or a two-axis accelerometer and a tilt sensor, which enable the controller 210 to determine the distance traveled along the ground irrespective of what angle the mobile terminal 100 is held relative to the ground.

Significant reduction in power consumption by the mobile terminal 100 may be achieved by selectively powering-off the GPS receiver circuit 200, and by determining when to power-on the GPS receiver circuit 200 using the acceleration information from the acceleration measurement circuit 220 to determine how far the mobile terminal 100 has moved. For example, the GPS receiver circuit 200 may consume at least 30 mW of power, while, in sharp contrast, the accelerometer circuit 220 may consume less than 3 mW of power. Consequently, using the accelerometer circuit 220 to more continuously determine location and repetitively powering-on/off the GPS receiver circuit 200 to update the mobile terminal's location can significantly extend the operational life of the mobile terminal 100 while powered by a battery.

Referring to trigger events 306 and 308, the controller 210 can regulate power to the GPS receiver circuit 200 in response to velocity of the mobile terminal 100. The controller 210 can determine velocity from the acceleration information (i.e., velocity can be determined from a single integration of acceleration information over time). When the velocity is less than a threshold velocity, the controller 210 can power-off the GPS receiver circuit 200 and/or, when repetitively cycling the GPS receiver circuit 200 on and off, can decrease the power-on to power-off duty cycle of the GPS receiver circuit 200. When the velocity is greater than a threshold velocity, the controller 210 can power-on the GPS receiver circuit 200 and/or, when repetitively cycling the GPS receiver circuit 200 on and off, increase the power-on to power-off duty cycle. Accordingly, the GPS receiver circuit 200 can be maintained powered-off when the mobile terminal 100 is substantially stationary, and can be repetitively cycled on and off when the mobile terminal 100 is moving. The GPS receiver circuit 200 can be maintained powered-off for longer periods of time when the mobile terminal 100 is being carried by a person who is walking slowly, and it can maintained powered-on for longer periods of time when the mobile terminal 100 is within a faster moving car.

The threshold velocity need not be static, as it may be regulated by the controller 210 to vary in response to, for example, time and/or the number and/or type of other communication networks that are detected by the mobile terminal (e.g., presence/absence of defined cellular system/WLAN/Bluetooth network).

Referring to trigger events 310 in 312, the controller 210 can regulate power to the GPS receiver circuit 200 in response to whether or not position assistance information is available from a cellular communication system. The controller 210 can detect the availability of position assistance information from a cellular system, and if such information is available (event 310) the controller 210 can decrease the power-on to power-off duty cycle of the GPS receiver circuit 200 (e.g., decrease the power-on duration and/or increase the power-off duration). In contrast, if position assistance information is not available (event 312), the controller 210 can increase the power-on to power-off duty cycle of the GPS receiver circuit 200 (e.g., increase the power-on duration and/or decrease the power-off duration). Thus, when position assistance information is available so that the GPS receiver circuit 200 can rapidly determine its location, the GPS receiver circuit 200 can be briefly powered-on for a sufficient time to determine its location using a combination of the position assistance information and GPS signals, and can then be powered-off and remain powered-off for a longer period of time before being powered-on again to quickly determine its location.

Referring to trigger event 314, the controller 210 can respond to detection of a new cellular base station identifier (ID) by powering-on the GPS receiver circuit 200 and/or, when repetitively turning on and off the GPS receiver circuit, the controller 210 can increase the power-on to power-off duty cycle of the GPS receiver circuit 200. The controller 210 can use the detection of a new cellular base station ID as an indication that the mobile terminal 100 has moved at least a threshold distance away from, for example, a last GPS determined location and/or a location of GPS isolation (e.g., moved outside of a building/roadway tunnel). For example, referring to FIG. 1, the mobile terminal 100 can receive a first base station ID from the base station 120a while it operates within cell 130a. When the mobile terminal 100 moves to cell 130b serviced by base station 120b, it receives a new base station ID from base station 120b. The controller 210 can respond to receipt of the new base station ID by powering-on the GPS receiver circuit 200 to determine its present location using GPS signals.

With reference to FIG. 2, the mobile terminal 100 can include the WLAN and/or Bluetooth transceiver 240 that encodes/decodes and controls communications according to one or more short range communication protocols, which may include, but are not limited to, Bluetooth and/or WiFi such as IEEE 802.11 (e.g., IEEE 802.11b-g). The WLAN/Bluetooth transceiver 240 can discover the presence of RF signals from a WLAN router (e.g., WLAN router 242) and/or a Bluetooth capable communication device (e.g., desktop computer/home appliance 244), and can detect the subsequent absence of those RF signals indicating that the mobile terminal 100 has moved beyond their communication range. The transceiver 240 may alternatively or additionally be configured to communicate via near field communication (NFC) signals and/or via any other short range communication signals (e.g., ultra-wideband communication signals, Zigbee, wireless HDMI).

Referring to trigger events 316 and 320, the controller 210 can power-off the GPS receiver circuit 200 in response to the transceiver 240 discovering a wireless local area network (WLAN) and/or a Bluetooth device that has been previously identified by the controller 210 and/or has been defined therein as being associated with a location where the mobile terminal 100 will be stationary for a relatively long period of time. The controller 210 may be configured to learn the association between discovery of RF signals from an identified WLAN router and/or from an identified Bluetooth device and the subsequent stationary resting of the mobile terminal 100 for at least a threshold time. The identity of various WLAN routers and/or Bluetooth devices that are associated with stationary locations of the mobile terminal 100 can be defined by a user via the keypad 250 and/or via another user interface of the mobile terminal 100 controller 210. In response to that identification and associated expectation that the mobile terminal 100 will remain substantially stationary for at least a threshold time, the controller 210 can conserve power by powering down the GPS receiver circuit 200 for at least a defined duration.

The controller 210 may calibrate the acceleration measurement circuit 220 in response to determining from the acceleration information that the mobile terminal 100 has moved at least a threshold calibration distance away from a previous location that was determined using GPS signals. For example, after moving at least a threshold calibration distance away from the previous GPS-determine location, the controller 210 can obtain to measurements for how far is it is traveled using the previous GPS-determined location and a new GPS-determined location, and using the previous GPS-determined location and the acceleration information while it was moving. The controller 210 can use the difference between the two distance measurements to calibrate how it determines location using the acceleration information.

For example, the controller 210 may calibrate the acceleration measurement circuit 220 by filtering (e.g., scaling, smoothing, and/or combining a known value/functional relationship with) the acceleration information and/or by adjusting clock timing used to double integrate the acceleration information over time. The controller 210 may using a clock to count time intervals (dt) and measure the average acceleration (vector A(i)) over the time intervals. The change in velocity (vector dV) in interval dt is A(i) times dt, which is dV. The change in position (vector dP) is then dV times dt or A(i) times dt and dt. Over time, the change in position P from position P1 to position P2 equals the sum of all dP(i) over the time used to move between P1 and P2. If P2 does not match the observed positions P'2, determined using the GPS signals, then the controller 210 can multiply a correction factor to the acceleration information so that the values for position P2 and P'2 are equal, thereby calibrating the acceleration measurement circuit 220.

The controller 210 can maintain the GPS receiver circuit 200 powered-off until it detects a subsequent event which indicates that the mobile terminal 100 has moved at least a threshold distance away from the previously determined stationary location. For example, with regard to trigger events 318 and 322, the GPS receiver circuit 200 can be maintained powered-off until the WLAN/Bluetooth transceiver 240 detects the absence of RF signals transmitted by the previously identified WLANs router (e.g. the WLAN router 242) and/or by the previously identified Bluetooth device (e.g., the desktop computer/home appliance 244), and in response to which it can be powered-on to determine its GPS/based location. Alternatively or additionally, the controller 210 can maintain the GPS receiver circuit 200 powered-off until it determines from acceleration information that the mobile terminal 100 has moved at least a threshold distance away from the previous stationary location, and in response to which the GPS receiver circuit 200 can be powered-on to determine its GPS/based location.

By way of example, when the mobile terminal 100 arrives at a home location, the WLAN/Bluetooth transceiver 240 can discover the presence of a known WLAN router and/or a Bluetooth device within the home that is identified by the controller circuit 210 as been located at the home location. Exemplary WLAN/Bluetooth devices that may be recognized as being at a home location can include, but are not limited to, a WLAN/Bluetooth configured desktop computer, refrigerator, thermostat, television system, and/or another home appliance.

Referring to trigger event 324, the controller 210 can identify when the mobile terminal 100 is presently at a location that was previously determined, and/or which has been defined, as a location where the mobile terminal 100 has or will remain stationary for at least a threshold time. For example, the controller 210 can learn when the mobile terminal 100 arrives at work and/or at home, it will remain substantially stationary at that location for a sufficiently long period of time that the controller 210 can achieve substantial power savings by powering-off the GPS receiver circuit 200. The controller 210 can then maintain the GPS receiver circuit 200 powered-off until it senses that it has moved at least a threshold distance from that location (e.g., via the acceleration information, sensing a new cellular base station ID, and/or detecting absence of RF signals from a previously identified WLAN and/or Bluetooth device). The controller 210 may decrease the power-on to power-off duty cycle of the GPS receiver circuit 200 to maintain the GPS receiver circuit 200 powered-off for longer periods of time between when it is powered-on to briefly attempt to detect its location using GPS signals.

Referring to trigger event 326, the controller 210 can identify when the mobile terminal 100 is located where it is isolated from GPS signals, such as can be determined from an insufficient GPS signal strength for the GPS receiver circuit 200 to determine its location during at least a threshold length of time. The threshold length of time may be defined so as to reduce/eliminate false GPS isolation determinations which may otherwise occur due to brief interruption of the GPS signals, such as from a user's temporary body positioning, other temporary signal path obstructions, and/or signal interference/multipath signal fading effects on the GPS signals.

The controller 210 may be further configured to operate as a proximity sensor that detects which an antenna of the GPS receiver circuit 200 is potentially shielded (GPS isolated) due to being close to a user's body (e.g., within a clothing pocket). The controller 210 may determine such proximity by a proximity sensor. The controller 210 may additionally or alternatively determine such proximity by detecting a GPS antenna impedance mismatch and/or change in GPS antenna impedance that is indicative of the GPS antenna experiencing a new impedance coupling to another object, such as to a user's body or a table on which the mobile terminal 100 is resting. The controller 210 may additionally or alternatively determine proximity and potential GPS isolation using a camera that, for example, senses a substantial change in brightness, which can be indicative of the mobile terminal 210 being placed in a clothing pocket, purse, or vehicle glove compartment.

The controller 210 can respond to the indication of GPS isolation by powering-off the GPS receiver circuit 200 until the mobile terminal 100 is determined to have moved at least a threshold distance away from that location. The controller 210 may additionally/alternatively decrease the GPS power-on to power-off duty cycle of the GPS receiver circuit 200 so that it remains powered-off for longer periods of time between power-on attempts to determine its location using GPS signals.

The controller 210 may also respond to the indication of GPS isolation by logging its location in the memory 256, and using the logged GPS isolation locations to determine when the mobile terminal 100 is located at a known GPS isolation location. When the mobile terminal 100 is located at a known GPS isolation location, the controller 210 may respond, via trigger event 326, by powering-off the GPS receiver circuit 200 until the mobile terminal 100 is determined to have moved at least a threshold distance away from that location. The controller 210 may additionally/alternatively decrease the GPS power-on to power-off duty cycle of the GPS receiver circuit 200 so that it remains powered-off for longer periods of time between power-on attempts to determine its location using GPS signals.

The mobile terminal 100 (via the controller 210) may be configured to share the GPS isolation locations that is has identified and, which may be, logged into memory 256 with other mobile terminals. For example, the mobile terminal 100 may communicate its known GPS isolation locations via the cellular transceiver 230 and/or the WLAN/Bluetooth transceiver 240 to other mobile terminals and/or to a centralized database that functions as a centralized repository of known GPS isolation locations. The mobile terminal 100 may similarly receive known GPS isolation locations from another mobile terminal and/or from a centralized repository of known GPS isolation locations. The GPS isolation locations may, for example, identify regions of a building where GPS signals do not have sufficient strength to allow location determination, and may similarly identify other regions of the building where GPS signals have sufficient strength to enable location determination.

GPS isolation locations that are identified in the centralized repository and/or within the memory 256 may be displayed on the mobile terminal 100 as a graphical overlay on a digitized map and/or on a satellite picture. A user may thereby visually observe where GPS signals coverage is blocked or otherwise insufficient to determine location. For example, when a user is operating the mobile terminal 100 within a building, a satellite image showing the building may be displayed on the mobile terminal and known GPS isolation locations may be overlayed on the displayed building. The user may thereby visually identify locations within the building where the user may acquire sufficient GPS signal strength to use the GPS receiver circuit 200 to determine location. Similarly, other electronic devices that can access the centralized repository and/or obtain GPS isolation locations directly/indirectly from the mobile terminal 100 may display those locations as a graphical overlay on a digitized map and/or on a satellite picture.

The controller 210 may maintain the GPS receiver circuit 200 powered-off while the mobile terminal 100 is located within a defined distance of a known GPS isolation location, and, upon determining that it has moved a sufficient distance therefrom (e.g., via the acceleration information), may power-on the GPS receiver circuit 200 to determine its location.

Although the exemplary GPS receiver circuit 200 has been described as being configured to determine geographic location of the mobile terminal 100 using GPS signals, it is not limited to carrying out the entire location determination by itself. For example, the GPS receiver circuit 200 may include RF receiver circuitry that receives GPS signals, and may include additional first processing circuitry that uses the GPS signals to generate timing measurements between the GPS receiver circuit 200 and corresponding GPS satellites, second processing circuitry that converts the timing measurements to distance measurements between the GPS receiver circuit 200 and the corresponding GPS satellites (e.g., by multiplying the timing measurements by the GPS signal propagation speed), third processing circuitry that uses translation, or other like mathematical techniques, to determine the position coordinates of the mobile terminal based on known locations of the GPS satellites and the distance measurements. The first, second, and/or third processing circuitry may be entirely within the GPS receiver circuit 200, or at least some of that circuitry may be embodied within the controller circuit 210 and/or within other circuitry of the mobile terminal 100. Accordingly, the controller circuit 210 can power-on and power-off the RF receiver circuitry and may further regulate power to other processing circuitry within the GPS receiver circuit 200 and/or elsewhere within the mobile terminal 100 that performs such position determination functionality.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method for determining location of a mobile terminal, comprising:
   repetitively switching power-on and power-off to a GPS receiver circuit which determines location of the mobile terminal using GPS signals; and
   regulating the power-on to power-off duty cycle of the GPS receiver circuit in response to distance that the mobile terminal has moved from a previously determined location by:
      detecting when the mobile terminal is GPS isolated in response to insufficient GPS signal strength for the GPS receiver circuit to determine location of the mobile terminal during at least a threshold length of time;
      powering-off the GPS receiver circuit in response to detecting that the mobile terminal is GPS isolated;
      determining a present acceleration-based location of the mobile terminal using acceleration information from an accelerometer circuit in the mobile terminal during the power-off cycle of the GPS receiver circuit;
      extending duration of the power-off cycle of the GPS receiver circuit until a distance between the present acceleration-based location and a previous GPS-determined location of the mobile terminal exceeds a threshold distance; and
      upon powering-on the GPS receiver circuit, attempting to determine a present GPS-determined location of the mobile terminal.

2. The method of claim 1, further comprising:
   calibrating the accelerometer circuit in response to a distance between a present acceleration-based location and a previous GPS-determined location of the mobile terminal exceeding a threshold calibration distance.

3. The method of claim 1, wherein regulating the power-on to power-off duty cycle of the GPS receiver circuit comprises:
   detecting when the mobile terminal is GPS isolated where there is insufficient GPS signal strength for the GPS receiver circuit to determine location of the mobile terminal;
   logging the location of the GPS isolation; and
   subsequently responding to the mobile terminal being located at a previously logged GPS isolation location by powering-off the GPS receiver circuit.

4. The method of claim 3, further comprising:
   receiving over a wireless air interface from another communication device at least one location where the mobile terminal will be GPS isolated; and
   adding the received at least one GPS isolation location to the log.

5. The method of claim 1, wherein regulating the power-on to power-off duty cycle of the GPS receiver circuit comprises:
   determining a GPS-based location of the mobile terminal using the GPS receiver circuit during the power-on cycle;
   determining a present acceleration-based location of the mobile terminal using acceleration information from an accelerometer circuit in the mobile terminal during the power-off cycle of the GPS receiver circuit; and
   extending duration of the power-off cycle of the GPS receiver circuit until the distance between the present acceleration-based location and the GPS-based location of the mobile terminal exceeds a threshold distance.

6. A method for determining location of a mobile terminal, comprising:
   repetitively switching power-on and power-off to a GPS receiver circuit which determines location of the mobile terminal using GPS signals; and
   determining a GPS-based location of the mobile terminal using the GPS receiver circuit during the power-on cycle;
   determining velocity of the mobile terminal using acceleration information from an accelerometer circuit in the mobile terminal during the power-off cycle of the GPS receiver circuit; and
   regulating the power-on to power-off duty cycle of the GPS receiver circuit in response to the determined velocity of the mobile terminal by:
      increasing the power-on to power-off duty cycle of the GPS receiver circuit in response to the determined mobile terminal velocity exceeding a threshold velocity; and
      decreasing the power-on to power-off duty cycle of the GPS receiver circuit in response to the determined mobile terminal velocity being less than a threshold velocity.

7. The method of claim 1, wherein regulating the power-on to power-off duty cycle of the GPS receiver circuit comprises:
   determining availability of position assistance information from a cellular system for use by the GPS receiver circuit to determine mobile terminal position;
   increasing the power-on to power-off duty cycle of the GPS receiver circuit in response to availability of position assistance information from a cellular system; and
   decreasing the power-on to power-off duty cycle of the GPS receiver circuit in response to unavailability of position assistance information from a cellular system.

8. A method for determining location of a mobile terminal, comprising:

repetitively switching power-on and power-off to a GPS receiver circuit which determines location of the mobile terminal using GPS signals; and regulating the power-on to power-off duty cycle of the GPS receiver circuit in response to distance that the mobile terminal has moved from a previously determined location by:

decreasing the power-on to power-off duty cycle of the GPS receiver circuit in response to discovering signals from a WLAN device associated with a previously determined and/or defined location where the mobile terminal remained substantially stationary for at least a threshold time; and increasing the power-on to power-off duty cycle of the GPS receiver circuit in response to detecting absence of signals from the WLAN device associated with the previously determined and/or defined location where the mobile terminal remained substantially stationary for at least the threshold time.

9. A method for determining location of a mobile terminal, comprising:

repetitively switching power-on and power-off to a GPS receiver circuit which determines location of the mobile terminal using GPS signals; and regulating the power-on to power-off duty cycle of the GPS receiver circuit in response to distance that the mobile terminal has moved from a previously determined location by:

decreasing the power-on to power-off duty cycle of the GPS receiver circuit in response to discovering signals from a Bluetooth device associated with a previously determined and/or defined location where the mobile terminal remained substantially stationary for at least a threshold time; and increasing the power-on to power-off duty cycle of the GPS receiver circuit in response to detecting absence of signals from the Bluetooth device associated with the previously determined and/or defined location where the mobile terminal remained substantially stationary for at least the threshold time.

10. A method for determining location of a mobile terminal, comprising:

repetitively switching power-on and power-off to a GPS receiver circuit which determines location of the mobile terminal using GPS signals; and regulating the power-on to power-off duty cycle of the GPS receiver circuit in response to distance that the mobile terminal has moved from a previously determined location by identifying an initial cellular base station ID where the GPS receiver became powered-off, and extending duration of the power-off cycle of the GPS receiver circuit until the mobile terminal receives and identifies a new cellular base station ID from a transmitting cellular base station, wherein the new cellular base station ID is different than the initial cellular base station ID.

11. A mobile terminal comprising:

a GPS receiver circuit configured to determine location of the mobile terminal using GPS signals;

a controller circuit configured to repetitively switch power-on and power-off to the GPS receiver circuit, and to regulate the power-on to power-off duty cycle of the GPS receiver circuit in response to distance that the mobile terminal has moved from a previously determined location;

an accelerometer circuit that generates acceleration information which is indicative of acceleration of the mobile terminal; and an acceleration-based position determination circuit configured to determine a present acceleration-based location of the mobile terminal using the acceleration information from the accelerometer circuit during the power-off cycle of the GPS receiver circuit, wherein the GPS receiver circuit is configured to detect when the mobile terminal is GPS isolated in response to insufficient GPS signal strength to determine location of the mobile terminal during at least a threshold length of time, and wherein the controller circuit is configured to power-off the GPS receiver circuit in response to detecting that the mobile terminal is GPS isolated, to extend duration of the power-off cycle of the GPS receiver circuit until a distance between the present acceleration-based location and a previous GPS-determine location of the mobile terminal exceeds a threshold distance, and to attempt to determine a present GPS-determined location of the mobile terminal upon powering-on the GPS receiver circuit.

12. The mobile terminal of claim 11, further comprising:

an accelerometer circuit that generates acceleration information which is indicative of acceleration of the mobile terminal; and an acceleration-based position determination circuit configured to determine a present accelerometer-based location of the mobile terminal using the acceleration information from the accelerometer circuit during the power-off cycle of the GPS receiver circuit, wherein the GPS receiver circuit determines a GPS-based location of the mobile terminal during the power-on cycle, and wherein the controller circuit extends the duration of the power-off cycle of the GPS receiver circuit until the distance between the present accelerometer-based location and the GPS-based location of the mobile terminal exceeds a threshold distance.

13. The mobile terminal of claim 12, further comprising:

a calibration circuit configured to calibrate the accelerometer circuit in response to a distance between a present acceleration-based location and a previous GPS-determined location of the mobile terminal exceeding a threshold calibration distance.

14. A mobile terminal comprising:

a GPS receiver circuit configured to determine location of the mobile terminal using GPS signals;

a controller circuit configured to repetitively switch power-on and power-off to the GPS receiver circuit, and to regulate the power-on to power-off duty cycle of the GPS receiver circuit in response to distance that the mobile terminal has moved from a previously determined location;

an accelerometer circuit that generates acceleration information which is indicative of acceleration of the mobile terminal; and a velocity determination circuit configured to determine velocity of the mobile terminal using the acceleration information from the accelerometer circuit during the power-off cycle of the GPS receiver circuit, wherein the controller circuit is configured to increase the power-on to power-off duty cycle of the GPS receiver circuit in response to the determined velocity of the mobile terminal exceeding a threshold velocity, and to decrease the power-on to power-off duty cycle of the GPS receiver circuit in response to the determined velocity of the mobile terminal being less than a threshold velocity.

15. The mobile terminal of claim 11, further comprising a cellular transceiver circuit configured to communicate with a cellular system and to receive position assistance information from a cellular system over a wireless air interface, wherein:
the GPS receiver circuit is configured to use the receive position assistance information to lock onto the GPS signals and determine location of the mobile terminal; and
the controller circuit is configured to determine availability of the position assistance information from the cellular system, to increase the power-on to power-off duty cycle of the GPS receiver circuit in response to availability of the cellular system position assistance information, and to decrease the power-on to power-off duty cycle of the GPS receiver circuit in response to unavailability of the cellular system position assistance information.

16. A mobile terminal comprising:
a GPS receiver circuit configured to determine location of the mobile terminal using GPS signals; and
a controller circuit configured to repetitively switch power-on and power-off to the GPS receiver circuit, and to regulate the power-on to power-off duty cycle of the GPS receiver circuit in response to distance that the mobile terminal has moved from a previously determined location, wherein
the controller circuit is configured to decrease the power-on to power-off duty cycle of the GPS receiver circuit in response to discovering signals from a WLAN device associated with a previously determined and/or defined location where the mobile terminal remained substantially stationary for at least a threshold time, and to increase the power-on to power-off duty cycle of the GPS receiver circuit in response to detecting absence of signals from the WLAN device associated with the previously determined and/or defined location where the mobile terminal remained substantially stationary for at least the threshold time.

17. A mobile terminal comprising:
a GPS receiver circuit configured to determine location of the mobile terminal using GPS signals; and
a controller circuit configured to repetitively switch power-on and power-off to the GPS receiver circuit, and to regulate the power-on to power-off duty cycle of the GPS receiver circuit in response to distance that the mobile terminal has moved from a previously determined location, wherein
the controller circuit is configured to decrease the power-on to power-off duty cycle of the GPS receiver circuit in response to discovering signals from a Bluetooth device associated with a previously determined and/or defined location where the mobile terminal remained substantially stationary for at least a threshold time, and to increase the power-on to power-off duty cycle of the GPS receiver circuit in response to detecting absence of signals from the Bluetooth device associated with a previously determined and/or defined location where the mobile terminal remained substantially stationary for at least the threshold time.

18. A mobile terminal comprising:
a GPS receiver circuit configured to determine location of the mobile terminal using GPS signals;
a cellular receiver configured to communicate with cellular base stations; and
a controller circuit configured to regulate power supplied to the GPS receiver circuit in response to distance that the mobile terminal has moved from a location previously determined using GPS signals, wherein the controller circuit is configured to identify an initial cellular base station ID where the GPS receiver became powered-off, and to power-on the GPS receiver circuit in response to receiving and identifying a new cellular base station ID from a cellular base station via the cellular receiver, wherein the new cellular base station ID is different than the initial cellular base station ID.

* * * * *